(12) United States Patent
Wei et al.

(10) Patent No.: US 11,002,608 B2
(45) Date of Patent: May 11, 2021

(54) BLACKBODY RADIATION SOURCE

(71) Applicants: Tsinghua University, Beijing (CN); HON HAI PRECISION INDUSTRY CO., LTD., New Taipei (TW)

(72) Inventors: Yang Wei, Beijing (CN); Guang Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 113 days.

(21) Appl. No.: 16/244,474

(22) Filed: Jan. 10, 2019

(65) Prior Publication Data

US 2020/0025624 A1 Jan. 23, 2020

(30) Foreign Application Priority Data

Jan. 11, 2018 (CN) .......................... 201810027427.9

(51) Int. Cl.
*G01J 5/52* (2006.01)
*G01J 5/00* (2006.01)
*G01J 5/02* (2006.01)

(52) U.S. Cl.
CPC .............. *G01J 5/522* (2013.01); *G01J 5/023* (2013.01); *G01J 2005/0048* (2013.01)

(58) Field of Classification Search
CPC .......... G01J 5/522; G01J 5/0225; G01J 5/023; B82Y 30/00; B82Y 40/00; C01B 2202/08
See application file for complete search history.

(56) References Cited

U.S. PATENT DOCUMENTS 7,354,877 B2 * 4/2008 Rosenberger ............. B32B 5/26
442/194
8,741,422 B2 6/2014 Miao
(Continued)

FOREIGN PATENT DOCUMENTS

CN 101400198 4/2009
CN 101409961 4/2009
(Continued)

OTHER PUBLICATIONS

Shimizu et al., Blackbody Thermal Radiator with Vertically Alighned Carbon Nanotube Coating, Japanese Journal of Applied Physics, May 15, 2014, 068004-1~068004-3.
(Continued)

*Primary Examiner* — Wyatt A Stoffa
(74) *Attorney, Agent, or Firm* — ScienBiziP, P.C.

(57) ABSTRACT

The present invention relates to a blackbody radiation source. The blackbody radiation source comprises a blackbody radiation cavity, a black lacquer layer and a plurality of carbon nanotubes. The blackbody radiation cavity comprises an inner surface. The black lacquer layer and the plurality of carbon nanotubes are located on the inner surface. Each carbon nanotube comprises a top end and a bottom end. The bottom end of each carbon nanotube is immersed into the black lacquer layer, and the top end of each carbon nanotube is exposed out from the black lacquer layer. An extending direction of each carbon nanotubes is substantially perpendicular to the inner surface.

14 Claims, 3 Drawing Sheets

(56) References Cited

U.S. PATENT DOCUMENTS

| | | | | |
|---|---|---|---|---|
| 8,828,749 | B2* | 9/2014 | Darnon | B82Y 35/00 438/17 |
| 9,067,791 | B2* | 6/2015 | Kim | B82Y 30/00 |
| 9,630,849 | B2* | 4/2017 | Wei | B32B 15/00 |
| 9,833,772 | B2* | 12/2017 | Cola | B01J 23/42 |
| 9,964,783 | B2* | 5/2018 | Huynh | B32B 27/00 |
| 10,125,022 | B2* | 11/2018 | Misra | B82Y 40/00 |
| 10,260,953 | B2* | 4/2019 | Engelbart | G01N 25/72 |
| 10,392,127 | B2* | 8/2019 | Kruckenberg | B64D 45/02 |
| 10,571,339 | B2* | 2/2020 | Wei | G01J 5/046 |
| 2007/0134599 | A1* | 6/2007 | Raravikar | C01B 32/16 430/325 |
| 2008/0192797 | A1* | 8/2008 | Ko | G05D 23/19 374/2 |
| 2009/0085461 | A1 | 4/2009 | Feng et al. | |
| 2009/0096348 | A1 | 4/2009 | Liu et al. | |
| 2009/0135042 | A1* | 5/2009 | Umishita | H05K 9/0083 342/1 |
| 2009/0321420 | A1 | 12/2009 | Feng et al. | |
| 2010/0021736 | A1* | 1/2010 | Slinker | H01L 21/4871 428/408 |
| 2010/0068461 | A1* | 3/2010 | Wallace | B81C 1/00111 428/156 |
| 2010/0075024 | A1* | 3/2010 | Ajayan | C08K 7/24 427/66 |
| 2011/0108545 | A1 | 5/2011 | Wang et al. | |
| 2011/0217451 | A1 | 9/2011 | Veerasamy | |
| 2011/0241536 | A1* | 10/2011 | Ajayan | C08K 7/24 313/498 |
| 2011/0315882 | A1 | 12/2011 | Hu et al. | |
| 2012/0021164 | A1* | 1/2012 | Sansom | B29C 70/64 428/95 |
| 2012/0104213 | A1 | 5/2012 | Feng et al. | |
| 2012/0107597 | A1* | 5/2012 | Kim | B82Y 30/00 428/292.1 |
| 2012/0312773 | A1 | 12/2012 | Cheng et al. | |
| 2012/0321961 | A1* | 12/2012 | Yushin | H01M 4/133 429/231.8 |
| 2013/0137324 | A1* | 5/2013 | Tang | C09D 5/006 442/131 |
| 2013/0190442 | A1* | 7/2013 | Mezghani | D01F 1/10 524/496 |
| 2013/0295320 | A1* | 11/2013 | Liu | B32B 5/12 428/113 |
| 2014/0037895 | A1* | 2/2014 | Jiang | H01J 9/025 428/119 |
| 2015/0048249 | A1* | 2/2015 | Hedler | H01L 35/00 250/338.4 |
| 2015/0367557 | A1 | 12/2015 | Wei et al. | |
| 2016/0279995 | A1* | 9/2016 | Langos | B41M 5/44 |
| 2017/0029275 | A1* | 2/2017 | Starkovich | C01B 32/168 |
| 2017/0120220 | A1* | 5/2017 | Watanabe | B01J 21/18 |
| 2017/0283262 | A1* | 10/2017 | Humfeld | C01B 32/16 |
| 2018/0145331 | A1* | 5/2018 | Yushin | H01M 4/366 |
| 2018/0179391 | A1* | 6/2018 | Bahlawane | C09D 7/70 |
| 2018/0346157 | A1* | 12/2018 | Werth | F02K 9/58 |
| 2019/0374974 | A1* | 12/2019 | Yoshida | B01J 20/205 |

FOREIGN PATENT DOCUMENTS

| | | |
|---|---|---|
| CN | 102452647 | 5/2012 |
| CN | 103382023 | 11/2013 |
| CN | 103602132 | 2/2014 |
| CN | 105197875 | 12/2015 |
| CN | 105562307 | 5/2016 |
| CN | 105675143 | 6/2016 |
| CN | 107014494 | 8/2017 |
| JP | 2015-203589 | 11/2015 |
| JP | 2017-3565 | 1/2017 |
| JP | 2017-024942 | 2/2017 |
| TW | 200834046 | 8/2008 |
| TW | 201125419 | 7/2011 |
| TW | 201144217 | 12/2011 |
| TW | 201250720 | 12/2012 |
| TW | I410615 | 10/2013 |
| TW | I486090 | 5/2015 |
| TW | 201625937 | 7/2016 |
| WO | 2016/107883 | 7/2016 |

OTHER PUBLICATIONS

Lim Zhi Han, Investigation of Laser-Carbon Nanotubes Interaction and Development of CNT-Based Devices, Ph.D Theses, Oct. 12, 2010, Check(https://scholar.google.com/scholar?as_q=&as_epq= Investigation of Laser-Carbon Nanotubes Interaction and Development of CNT-Based Devices&as_occt=any).

Kohei Mizuno et al., A Black Body Absorber from Vertically Aligned Single-walled Carbon Nanotubes, PNAS, Apr. 14, 2009, 6044-6047, vol. 106, No. 15.

Zhao Jun Han et al., Large-Diameter Single-Walled Carbon Nanotubes, J. Am. Chem. Soc., Mar. 12, 2012, 6018-6024, 134, 13.

Kohei Mizuno et al. A black body absorber from vertically aligned single-walled carbon nanotubes, Proceedings of the Natinal Academy of Sciences, Apr. 14, 2009, vol. 106, 6044-6047.

\* cited by examiner

BLACKBODY RADIATION SOURCE

CROSS-REFERENCE TO RELATED APPLICATIONS

This application claims all benefits accruing under 35 U.S.C. § 119 from China Patent Application No. 201810027427.9 filed on Jan. 11, 2018, in the China National Intellectual Property Administration, the contents of which are hereby incorporated by reference. This application is related to applications entitled, "PLANE SOURCE BLACKBODY", filed Jan. 10, 2019 Ser. No. 16/244,449, "BLACKBODY RADIATION SOURCE", filed Jan. 10, 2019 Ser. No. 16/244,455, "BLACKBODY RADIATION SOURCE", filed Jan. 10, 2019 Ser. No. 16/244,468, "BLACKBODY RADIATION SOURCE", filed Jan. 10, 2019 Ser. No. 16/244,481, "PLANE SOURCE BLACKBODY", filed Jan. 10, 2019 Ser. No. 16/244,488, "CAVITY BLACKBODY RADIATION SOURCE AND METHOD OF MAKING THE SAME", filed Nov. 21, 2018 Ser. No. 16/198,549, "CAVITY BLACKBODY RADIATION SOURCE", filed Nov. 21, 2018 Ser. No. 16/198,565, "PLANE SOURCE BLACKBODY", filed Nov. 21, 2018 Ser. No. 16/198,577, "CAVITY BLACKBODY RADIATION SOURCE AND METHOD OF MAKING THE SAME", filed Nov. 21, 2018 Ser. No. 16/198,590, "CAVITY BLACKBODY RADIATION SOURCE AND METHOD OF MAKING THE SAME", filed Nov. 21, 2018 Ser. No. 16/198,598, and "PLANE SOURCE BLACKBODY", filed Nov. 21, 2018 Ser. No. 16/198,606.

FIELD

The present disclosure relates to a blackbody radiation source, especially, relates to a cavity blackbody radiation source.

BACKGROUND

With a rapid development of infrared remote sensing technology, the infrared remote sensing technology is widely used in military fields and civil fields, such as earth exploration, weather forecasting, and environmental monitoring. Known infrared detectors need to be calibrated by a blackbody before they can be used. The higher an effective emissivity of the blackbody, the higher a calibration accuracy of the infrared detector. Used as a standard radiation source, a role of blackbody is increasingly prominent. An effective emissivity of a cavity blackbody mainly depends on an opening size of the cavity blackbody, a shape of the cavity blackbody, an emissivity of materials on an inner surface of the cavity blackbody and an isothermal degree inside the cavity blackbody. Therefore, to obtain high performance blackbody radiation sources, it is important to use inner surface materials with high emissivity.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the exemplary embodiments. Moreover, in the drawings, like reference numerals designate corresponding parts throughout the several views.

DETAILED DESCRIPTION

Figure 1:
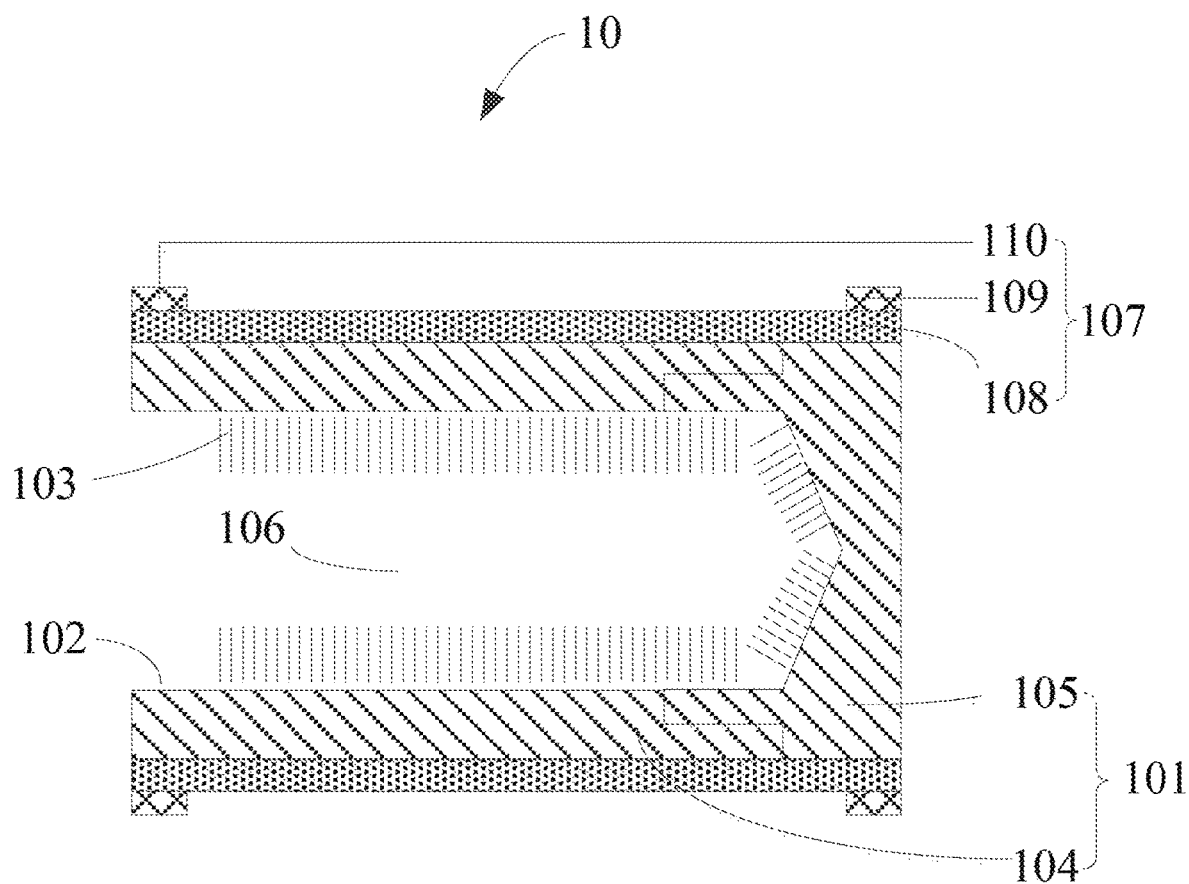
FIG. 1 is a schematic view of a cross-sectional structure of a blackbody radiation source according to one embodiment.

The disclosure is illustrated by way of embodiments and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "include," when utilized, means "include, but not necessarily limited to"; it specifically indicates open-ended inclusion or membership in the so-described combination, group, series, and the like.

A blackbody radiation source is provided according to the present disclosure. The blackbody radiation source comprises a blackbody radiation cavity. The blackbody radiation cavity comprises an inner surface. A plurality of carbon nanotubes are located on the inner surface. An extending direction of each of the carbon nanotubes is substantially perpendicular to the inner surface.

A carbon nanotube array can be located on the inner surface. The carbon nanotube array comprises a plurality of carbon nanotubes. The carbon nanotube array comprises a first surface and a second surface, wherein the first surface is in contact with the inner surface of the blackbody radiation cavity and the second surface is away from the inner surface of the blackbody radiation cavity. The plurality of carbon nanotubes extend from the first surface to the second surface.

Each of the carbon nanotubes comprises a top end and a bottom end, wherein the top end is away from the inner surface and the bottom end is in contact with the inner surface. In one embodiment, the top ends of the carbon nanotubes are open ends, and the open ends of the carbon nanotubes are not blocked by catalysts particles or something else.

The plurality of carbon nanotubes can be distributed on the inner surface as a pattern. By "pattern", it means that the inner surface is partially covered by the plurality of carbon nanotubes. A shape and position of the pattern are not limited. The first surface of the panel which is not covered by the carbon nanotube array can be covered by a black coating. A ratio between a area of the first surface which is covered by the carbon nanotube array and a area of the first surface which is covered by the black coating can range from about 1:9 to 9:1.

The black coating can be a black lacquer having high emissivity, a black lacquer mixed with carbon nanotubes, or a carbon nanotube layer structure. The black lacquer has high emissivity, such as PYROMARK® 1200 black lacquer having an emissivity of 0.92, NEXTEL® Velvet 811-21 black lacquer having an emissivity of 0.95, etc. A weight percentage of the carbon nanotubes in the black lacquer mixed with carbon nanotubes can be in a range from about 1% to about 50%. The carbon nanotube layer structure comprises a plurality of carbon nanotubes extending along a direction substantially parallel to a surface of the carbon nanotube layer structure. The carbon nanotube layer structure comprises at least one carbon nanotube film, at least one carbon nanotube wire, or a combination thereof. Further, the carbon nanotube layer structure is porous and comprises a plurality of micropores.

The blackbody radiation cavity is made from materials resistant to high temperatures and having high emissivity. The materials can be duralumin, aluminum alloy or oxygen-free copper.

The blackbody radiation cavity comprises a cavity and a cavity bottom. The materials of the cavity and the cavity bottom can be same or different. The cavity and the cavity bottom can be an integrally formed structure. The cavity and the cavity bottom can also be two independent structures. The cavity bottom can be pressed or screwed into the cavity from an end opening of the cavity.

The blackbody radiation cavity defines a room. A cross-sectional shape of the room can be circle, ellipse, triangle, quad, or other polygon. The room ends at the cavity bottom. A shape of a bottom surface of the room is not limited. The shape of the bottom surface of the room can be a flat surface, a tapered surface, a prismatic surface, or other surfaces.

The inner surface of the blackbody radiation cavity can be smooth, or can comprise a plurality of microstructures. In one embodiment, there are a plurality of grooves spaced apart from each other on the inner surface. The plurality of grooves are arranged in a matrix. Each of the grooves can be an annular groove, a strip groove, a dot-shaped groove or a spiral groove extending spirally along a axial direction of the blackbody radiation cavity. Cross-sectional shapes of the grooves can be rectangles or trapezoids. The inner surface is divided into a first inner surface and a second inner surface by the plurality of grooves. The first inner surface is a surface of a region between grooves, and the second inner surface is a bottom surface of each groove. The first inner surface and the second inner surface are alternately arranged. Both of the first inner surface and the second inner surface are covered by the plurality of carbon nanotubes which extend in a direction substantially perpendicular to the inner surface of the blackbody radiation cavity.

In one embodiment, the blackbody radiation source further comprises a heating element. The heating element comprises a carbon nanotube structure, a first electrode and a second electrode. The first electrode and the second electrode are spaced apart from each other on a surface of the carbon nanotube structure. The carbon nanotube structure is wrapped or wound around an outer surface of the blackbody radiation cavity. The carbon nanotube structure comprises at least one carbon nanotube film or at least one carbon nanotube long wire. The carbon nanotube structure comprises a plurality of carbon nanotubes joined end to end and preferentially oriented along a same direction. The plurality of carbon nanotubes of the carbon nanotube structure extend from the first electrode toward the second electrode.

Because the carbon nanotube structure is wrapped or wound around the outer surface of the blackbody radiation cavity, after energized by the first electrode and the second electrode, the carbon nanotube structure can heat the whole blackbody radiation cavity. Therefore a temperature field inside the blackbody radiation cavity can be evenly distributed, and a temperature stability and a temperature uniformity of the blackbody radiation source can be improved. Since carbon nanotube has low density and is light, the blackbody radiation source using the carbon nanotube structure as the heating element may be light and compact. The carbon nanotube structure has low electrical resistance, high electrothermal conversion efficiency and low thermal resistivity. So using the carbon nanotube structure to heat the blackbody radiation cavity has the characteristics of rapid temperature rise, small thermal hysteresis and fast heat exchange rate. Carbon nanotube materials have excellent toughness, thus the blackbody radiation source using the carbon nanotube structure as the heating element has a long service life.

The blackbody radiation source provided by the present disclosure has the following characteristics.

Firstly, carbon nanotubes are currently the blackest material in the world. Tiny gaps between carbon nanotubes in a carbon nanotube array can prevent an incident light from being reflected off a surface of the array, so the emissivity of the carbon nanotube array is high. The emissivity of the carbon nanotube array is as high as 99.6% according to a measurement, which is far larger than that of the inner surface materials of the blackbody cavity currently used. For example, the emissivity of NEXTEL® Velvet 811-21 black lacquer is 96%.

Secondly, to obtain a high emissivity, a depth of the blackbody radiation cavity is often increased and a caliber of the blackbody radiation cavity is often reduced. Using carbon nanotube array as the inner surface material of the blackbody radiation cavity according to the present disclosure, the depth of the black body radiation cavity may be reduced with the same effective emissivity of the cavity. Therefore, miniaturization and wide applications of the blackbody radiation sources can be realized.

Thirdly, the carbon nanotubes can be prepared conveniently and quickly by a chemical vapor deposition of carbon source gas under high temperature conditions, and the raw materials are cheap and easy to obtain.

Fourthly, the carbon nanotubes have excellent thermal conductivity. So it can improve the temperature uniformity and the temperature stability of the blackbody radiation source with the carbon nanotube array as the inner surface material of the blackbody radiation cavity.

Fifthly, the carbon nanotubes have excellent mechanical properties, so the blackbody radiation source using carbon nanotubes has a good structural stability and may not be easily damaged in harsh environment.

Referring to FIG. 1, a blackbody radiation source 10 according to one embodiment is provided. The blackbody radiation source 10 comprises a blackbody radiation cavity 101. The blackbody radiation cavity 101 comprises an inner surface 102. A plurality of carbon nanotubes 103 are located on the inner surface 102. An extending direction of each carbon nanotube 103 is substantially perpendicular to the inner surface 102.

The blackbody radiation cavity 101 is made from an aluminum alloy. The blackbody radiation cavity 101 comprises a cavity 104 and a cavity bottom 105. The cavity 104 and the cavity bottom 105 are two independent structures. The cavity bottom 105 can be screwed into the cavity 104 through threads on the inner surface of the cavity 104. The blackbody radiation cavity 101 defines a room 106. A cross-sectional shape of the room 106 is circle. A shape of a bottom surface of the room 106 is a tapered surface. The blackbody radiation cavity 101 further comprises a heating element 108 on an outer surface of the blackbody radiation cavity 101. The heating element 107 comprises a carbon nanotube structure 108, a first electrode 109 and a second electrode 110.

A method for making the blackbody radiation source 10 is provided in one embodiment. The method comprises the following steps:

S11, providing a blackbody radiation cavity 101, wherein the blackbody radiation cavity comprises an inner surface 102;

S12, forming a plurality of carbon nanotubes 103 on the inner surface 102, wherein an extending direction of each carbon nanotube 103 is substantially perpendicular to the inner surface 102.

In the step S11, the blackbody radiation cavity 101 comprises a cavity 104 and a cavity bottom 105. The blackbody cavity bottom 105 can be screwed into the cavity 104 through threads on the inner surface of the cavity 104. Both of the cavity 104 and the cavity bottom 105 are made from an aluminum alloy. The cavity 104 defines a cylindrical room 106. A shape of a bottom surface of the room 106 is a tapered surface.

In the step S12, the plurality of carbon nanotubes 103 can be formed on the inner surface 102 by a method of direct growth or a method of transfer. A plurality of carbon nanotubes are formed on the inner surface of the cavity 104 and the cavity bottom 105 respectively. Then the cavity bottom 105 is screwed into the cavity 104 to form the blackbody radiation source 10. The followings are taking a process of forming the plurality of carbon nanotubes on the inner surface of the cavity for example to describe the two methods mentioned above in detail.

The method of direct growth, that is, growing a carbon nanotube array directly on the inner surface of the cavity, comprises the following steps:

Step one, depositing a layer of catalyst on the inner surface of the cavity.

Step two, heating the cavity to a growth temperature of the carbon nanotube array under an atmosphere of a protective gas, and then introducing a carbon source gas into the cavity to grow a carbon nanotube array on the inner surface of the cavity.

In the step one, a layer of catalyst can be deposited on the inner surface by a method of electron beam evaporation, magnetron sputtering, and thermal deposition. The catalyst may be iron (Fe), cobalt (Co), nickel (Ni) or alloys thereof. A thickness of the catalyst is in a range from about 1 to about 10 nm.

In one embodiment, a patterned mask is formed on the inner surface before depositing the catalyst layer. The patterned mask exposes parts of the inner surface. Then the catalyst is deposited in the exposed part of the inner surface to obtain a patterned catalyst film, and thus a patterned carbon nanotube array can be obtained.

In the step two, the cavity is heated to a temperature in a range from about 500 to about 900° C. under the atmosphere of the protective gas, and in one embodiment, the temperature is in a range from about 600 to about 720° C. Then, a mixed gas of the carbon source gas and the protective gas is introduced into the cavity. The carbon source gas can be acetylene, ethylene, methane, ethane. The protective gas comprises inert gas or nitrogen. The heating time ranges from about 10 to about 40 minutes.

The carbon nanotube array can be further treated to make ends of the plurality of carbon nanotubes of the carbon nanotube array away from the inner surface open. The treating method comprises: using a laser beam to cut open the plurality of carbon nanotubes.

The method of transfer, that is, growing a carbon nanotube array on a surface of a substrate and then transferring the carbon nanotube array to the inner surface of the cavity 104, comprises the following steps:

Step A, providing a substrate, wherein a carbon nanotube array is grown on a surface of the substrate;

Step B, providing a film, and transferring the carbon nanotube array to a surface of the film;

Step C, rolling the film into a cylindrical structure, wherein the carbon nanotube array is on an outer surface of the cylindrical structure;

Step D, inserting the cylindrical structure into the cavity 104, and adhering the carbon nanotube array to the inner surface of the cavity 104, and then removing the film.

In the step A, the carbon nanotube array comprises a plurality of carbon nanotubes. The ends of the plurality of carbon nanotubes adjacent to the substrate are defined as growth ends, and the ends of the plurality of carbon nanotubes far away from the substrate are defined as top ends.

In the step B, the film has flexibility and can be a PET film or a PDMS film. The film is placed on the top ends of the plurality of carbon nanotubes of the carbon nanotube array, and the film is pressed slightly to ensure the film is contacted fully with the top ends of the plurality of carbon nanotubes. Then the film is gently moved. The plurality of carbon nanotubes can move with the film move. Thus the growth ends of the plurality of carbon nanotubes are separated from the substrate and open. In this way, the carbon nanotube array is transferred onto the surface of the film. The top ends of the plurality of carbon nanotubes are in contact with the surface of the film, and the growth ends of the plurality of carbon nanotubes are away from the surface of the film. The film and the carbon nanotube array are self-adhesive and are combined by van der Waals force.

In the step C, a size of the cylindrical structure can be adjusted according to the size of the cavity to ensure that the cylindrical structure can be inserted into the cavity.

In the step D, a surface of the carbon nanotube array away from the film is in contact with the inner surface of the cavity. In addition, a layer of glue can be applied on the inner surface of the cavity in advance to ensure that the carbon nanotube array is tightly fixed on the inner surface of the cavity.

In one embodiment, the carbon nanotube array can be transferred twice before the carbon nanotube array is transferred to the inner surface of the cavity. In this way, the top ends of the plurality of carbon nanotubes can be in contact with the inner surface, and the open growth ends of the plurality of carbon nanotubes can be away from the inner surface.

The method further comprises putting a heating element 107 on the outer surface of the blackbody radiation cavity 101, thus the blackbody radiation source 10 can be heated in real time.

Figure 2:
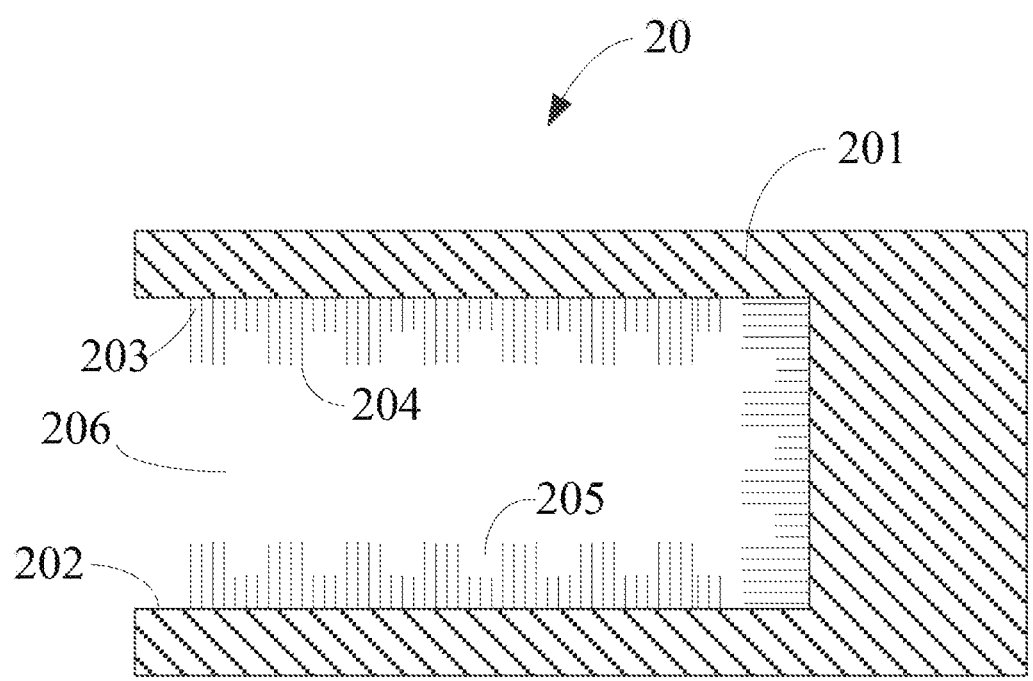
FIG. 2 is a schematic view of a cross-sectional structure of a blackbody radiation source according to another embodiment.

Referring to FIG. 2, a blackbody radiation source 20 according to another embodiment is provided. The blackbody radiation source 20 comprises a blackbody radiation cavity 201. The blackbody radiation cavity 201 comprises an inner surface 202. A carbon nanotube array 203 is located on the inner surface 202. The carbon nanotube array comprises a plurality of carbon nanotubes 204. An extending direction of each of the carbon nanotubes 204 is substantially perpendicular to the inner surface 202. The carbon nanotube array 203 comprises a first surface and a second surface. The first surface is in contact with the inner surface 202 and the second surface is far away from the inner surface 202. The plurality of carbon nanotubes 204 extend from the first surface to the second surface. A plurality of microstructures 205 are formed on the second surface of the carbon nanotube array 203.

The blackbody radiation cavity 201 is an integrally formed structure of cylindrical. A material of the blackbody radiation cavity 201 is an aluminum alloy. The blackbody radiation cavity 201 defines a room 206. A cross-sectional shape of the room 206 is circle, and a shape of a bottom surface of the room 206 is a flat surface.

In one embodiment, the plurality of microstructures 205 comprises a plurality of micro-grooves formed on the second surface of the carbon nanotube array 203. Each of the micro-grooves can be an annular micro-groove, a strip micro-groove, a dot-shaped micro-groove or a spiral micro-groove extending spirally along an axial of the blackbody radiation cavity. Cross-sectional shapes of the micro-grooves are not limited, and can be inverted triangles, rectangles, trapezoids or semicircles.

A method for making the blackbody radiation source 20 is provided in another embodiment. The method comprises the following steps:

S21, providing a blackbody radiation cavity 201, wherein the blackbody radiation cavity 201 comprises an inner surface 202;

S22, forming a carbon nanotube array 203 on the inner surface 202;

S23, forming a plurality of microstructures 205 on the second surface of the carbon nanotube array 203.

In the step S21, the blackbody radiation cavity 201 is an integrally formed cylindrical structure. A material of the black body radiation cavity 201 is an aluminum alloy. The blackbody radiation cavity 201 defines a room 206. A cross-sectional shape of the room 206 is circle, and a shape of a bottom surface of the room 206 is a flat surface.

In the step S22, the carbon nanotube array 203 can be placed on the inner surface 202 by a method of direct growth or a method of transfer. The specific operation method is the same as that of the step S12, and will not be described in detail here.

In the step S23, a laser generator is provided to generate a laser beam. The laser beam is used to irradiate the second surface of the carbon nanotube array 203 to form a plurality of microstructures 205 on the second surface of the carbon nanotube array 203.

During a process of laser irradiation, since a high energy of the laser beam can be absorbed by carbon nanotubes on the paths of the laser beams, the temperature of the carbon nanotubes become high and the carbon nanotubes can react with the oxygen in the air, and then decompose. Thus, the carbon nanotubes on the paths of the laser beams will be removed. In this way, the plurality of microstructures 205 can be formed on the second surface of the carbon nanotube array 203. A scanning path of the laser beams can be set precisely by a computer in advance to form a complex etched pattern on the second surface of the carbon nanotube array 203. A direction in which the laser beam is incident can be at an angle to the second surface of the carbon nanotube array 203. In one embodiment, the angle ranges from about 55 degrees to about 90 degrees.

It is indicated by existing research that the larger the inner surface area of the blackbody radiation cavity, the higher the emissivity of the blackbody radiation cavity. In the present disclosure, the plurality of microstructures 205 formed on the second surface of the carbon nanotube array 203 is equivalent to an increase of the inner surface area of the blackbody radiation cavity 201. Therefore, the emissivity of the blackbody radiation cavity 201 can be further increased.

Figure 3:
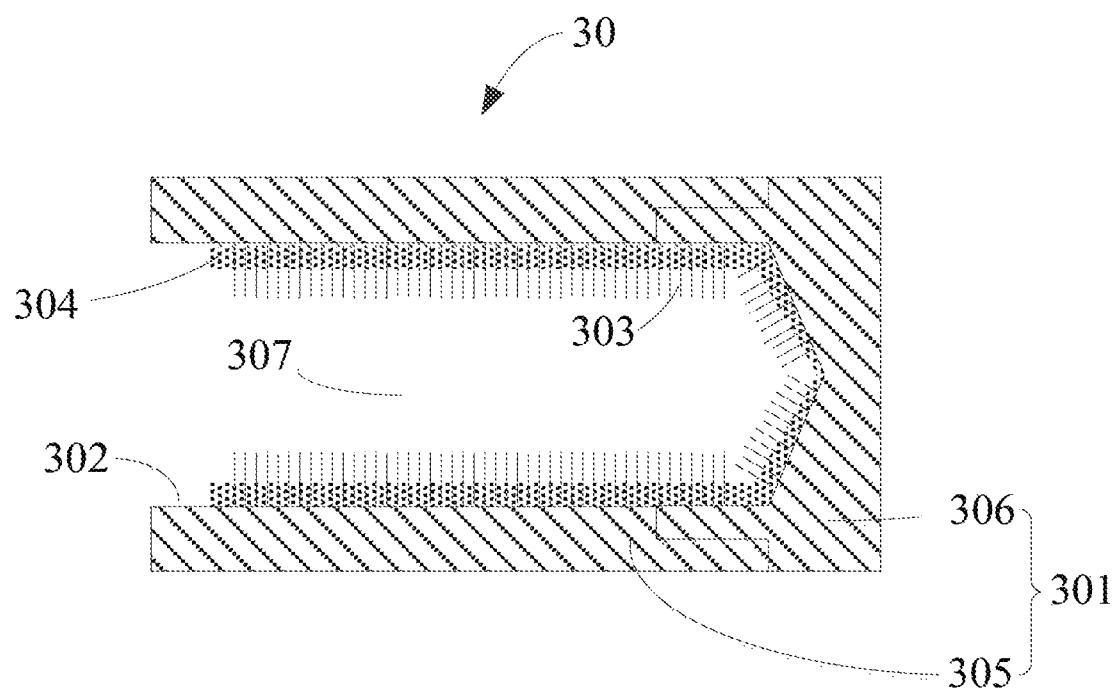
FIG. 3 is a schematic view of a cross-sectional structure of a blackbody radiation source according to yet another embodiment.

Referring to FIG. 3, a blackbody radiation source 30 according to yet another embodiment is provided. The blackbody radiation source 30 comprises a blackbody radiation cavity 301. The blackbody radiation cavity 301 comprises an inner surface 302. A black lacquer layer 304 and a plurality of carbon nanotubes 303 are located on the inner surface 302. Each of the carbon nanotube 303 comprises a top end and a bottom end. The bottom end of each of the carbon nanotube 303 is immersed into the black lacquer layer 304, and the top end of each of the carbon nanotube 303 is exposed out from the black lacquer layer 304. An extending direction of each of the carbon nanotubes 303 is substantially perpendicular to the inner surface 302.

The blackbody radiation cavity 301 is made from an oxygen-free copper. The blackbody radiation cavity 301 comprises a cavity 305 and a cavity bottom 306. The cavity 305 and the cavity bottom 306 are two independent structures. The cavity bottom 306 is screwed into the cavity 305 through threads on the inner surface of the cavity 305. The blackbody radiation cavity 301 defines a room 307. Across-sectional shape of the room 307 is circle, and a shape of a bottom surface of the room 307 is a tapered surface.

The black lacquer layer 304 is a black lacquer with high emissivity, such as PYROMARK® 1200 black lacquer having its emissivity of 0.92), NEXTEL® Velvet 811-21 black lacquer having its emissivity of 0.95, etc. NEXTEL® Velvet 811-21 black lacquer is used in this embodiment. A thickness of the black lacquer layer 304 should not be too small or too large. On one hand, if the thickness of the black lacquer layer 304 is too small, the top end of each carbon nanotubes 303, disposed into the black lacquer layer 304, may not be immersed in the black lacquer layer 304 completely. Therefore, the plurality of carbon nanotubes 303 may not be in contact with the black lacquer layer 304 tightly and be firmly fixed to a surface of the black lacquer layer 304. On the other hand, if the thickness of the black lacquer layer 304 is too large, the plurality of carbon nanotubes 303 can be completely embedded in the black lacquer layer 304 and not protruding out of the black lacquer layer 304. So a structure of the plurality of carbon nanotubes 303 may be destroyed, and may not function as materials of high emissivity. In one embodiment, the thickness of the black lacquer layer 304 is in a range from about 1 micrometer to about 300 micrometers.

A method for making the blackbody radiation source 30 is provided in yet another embodiment. The method comprises the following steps:

S31, providing a blackbody radiation cavity 301, wherein the blackbody radiation cavity 301 comprises an inner surface 302;

S32, coating the inner surface 302 with a black lacquer layer 304;

S33, placing a plurality of carbon nanotubes 303 on the inner surface 302, wherein a bottom end of each of the carbon nanotubes 303 is immersed into the black lacquer layer 304 and a top end of each of the carbon nanotubes 303 is exposed out from the black lacquer layer 304, and an extending direction of each of the carbon nanotubes 303 is substantially perpendicular to the inner surface 302.

In the step S31, the blackbody radiation cavity 301 is made from an oxygen-free copper. The blackbody radiation cavity 301 comprises a cavity 305 and a cavity bottom 306. The cavity 305 and the cavity bottom 306 are two independent structures. The cavity bottom 306 is screwed into the cavity 305 through threads on the inner surface of the cavity 305. The blackbody radiation cavity 301 defines a room 307. A cross-sectional shape of the room 307 is circle, and a shape of a bottom surface of the room 307 is a tapered surface.

In the step S32, NEXTEL® Velvet 811-21 black lacquer is used in this embodiment. A thickness of the black lacquer layer 304 should not be too small or too large. In one embodiment, the thickness of the black lacquer layer 304 is in a range from about 1 micrometer to about 300 micrometers.

In the step S33, the plurality of carbon nanotubes 303 can be placed on the inner surface 302 through a method of transfer. The specific operation method is the same as that of the step S12, and will not be described in detail here.

After the plurality of carbon nanotubes 303 are placed on the inner surface 302, the black lacquer layer 304 can be solidified through a process of natural drying. Because the black lacquer layer 304 is of certain viscosity, the plurality of carbon nanotubes 303 can be tightly fixed on the inner surface 302 through the black lacquer layer 304 and do not easily fall off from the inner surface 302.

A layer of black lacquer layer 304 is formed on the inner surface 302 first, and then a plurality of carbon nanotubes 303 are placed on the inner surface 302. The black lacquer layer 304 is not only a high emissivity material but also functions as a glue to keep the plurality of carbon nanotubes 303 fixed on the inner surface 302. Thereby the emissivity of the blackbody radiation source 30 is further improved, the stability of the blackbody radiation source 30 is further enhanced, and the service life of the blackbody radiation source 30 is further prolonged. In addition, when a plurality of carbon nanotubes 303 are placed on part of the inner surface 302, a height difference between the region where carbon nanotubes are placed and the region where there are no carbon nanotubes is formed. Such surface characters are equivalent to forming a plurality of microstructures on the inner surface 302, and therefore the emissivity of the blackbody radiation source 30 can be further increased.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A blackbody radiation source comprising:
a blackbody radiation cavity comprising an inner surface;
a black lacquer layer on the inner surface of the blackbody radiation cavity;
a plurality of carbon nanotubes on the inner surface of the blackbody radiation cavity, wherein
each of the carbon nanotubes comprises a top end and a bottom end, the bottom end of each of the carbon nanotubes is immersed in the black lacquer layer and the top end of each of the carbon nanotubes is exposed out from the black lacquer layer, and an extending direction of each of the carbon nanotubes is substantially perpendicular to the inner surface of the blackbody radiation cavity.

2. The blackbody radiation source of claim 1, wherein a thickness of the black lacquer layer ranges from 1 micrometer to 300 micrometers.

3. The blackbody radiation source of claim 1, wherein the top end of each of the carbon nanotubes is an open end.

4. The blackbody radiation source of claim 1, wherein the inner surface of the blackbody radiation cavity is partially covered by the plurality of carbon nanotubes.

5. The blackbody radiation source of claim 1, wherein the blackbody radiation source further comprises a heating element located on an outer surface of the blackbody radiation cavity.

6. The blackbody radiation source of claim 5, wherein the heating element comprises a carbon nanotube structure, a first electrode and a second electrode, and the first electrode and the second electrode are spaced apart from each other on a surface of the carbon nanotube structure.

7. The blackbody radiation source of claim 6, wherein the carbon nanotube structure comprises a plurality of carbon nanotubes joined end to end and substantially oriented along a same direction, and the plurality of carbon nanotubes of the carbon nanotube structure extend from the first electrode towards the second electrode.

8. The blackbody radiation source of claim 1, wherein the inner surface of the blackbody radiation cavity defines a plurality of grooves separated from each other.

9. The blackbody radiation source of claim 8, wherein each of the grooves is an annular groove, a strip groove, a dot-shaped groove or a spiral groove extending spirally along an axial direction of the blackbody radiation cavity.

10. The blackbody radiation source of claim 8, wherein the plurality of grooves are arranged to form a matrix manner on the inner surface of the blackbody radiation cavity.

11. The blackbody radiation source of claim 8, wherein cross-sectional shapes of the grooves are rectangles or trapezoids.

12. The blackbody radiation source of claim 1, wherein the blackbody radiation cavity defines a room.

13. The blackbody radiation source of claim 12, wherein a cross-sectional shape of the room is a circular, an elliptical, a triangular, or a quadrangular.

14. The blackbody radiation source of claim 12, wherein a bottom surface of the room is a flat surface or a tapered surface.

* * * * *